United States Patent
Liao et al.

(10) Patent No.: US 11,301,337 B2
(45) Date of Patent: Apr. 12, 2022

(54) METHOD, DEVICE, AND COMPUTER PROGRAM PRODUCT FOR MANAGING BACKUP SYSTEM

(71) Applicant: EMC IP Holding Company LLC, Hopkinton, MA (US)

(72) Inventors: Lanjun Liao, Chengdu (CN); Jing Wang, Chengdu (CN); Bing Bai, Chengdu (CN); Qingxiao Zheng, Chengdu (CN); Li Sun, Chengdu (CN); Xueqing Wang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 82 days.

(21) Appl. No.: 16/888,784

(22) Filed: May 31, 2020

(65) Prior Publication Data

US 2021/0224164 A1  Jul. 22, 2021

(30) Foreign Application Priority Data

Jan. 17, 2020 (CN) .......................... 202010052854.X

(51) Int. Cl.
*G06F 11/14* (2006.01)
*G06F 11/07* (2006.01)

(52) U.S. Cl.
CPC ........ *G06F 11/1464* (2013.01); *G06F 11/076* (2013.01); *G06F 11/0772* (2013.01); *G06F 11/1451* (2013.01); *G06F 11/1461* (2013.01); *G06F 11/1469* (2013.01)

(58) Field of Classification Search
CPC ............... G06F 11/1464; G06F 11/076; G06F 11/0772; G06F 11/1451; G06F 11/1461; G06F 11/1469; G06F 3/0646; G06F 3/0647; G06F 3/065
See application file for complete search history.

(56) References Cited

U.S. PATENT DOCUMENTS 10,002,173 B1 * 6/2018 Ramachandran ..... G06F 16/273

* cited by examiner

*Primary Examiner* — Shawn X Gu
(74) *Attorney, Agent, or Firm* — Chamberlain, Hrdlicka, White, Williams & Aughtry

(57) ABSTRACT

The present disclosure relates to a method, device and computer program product for managing a backup system. In a method for managing a backup system, at least one backup attribute of a backup demand on the backup system is determined, the at least one backup attribute describing at least one aspect of a demand on the backup system from a user of the backup system. A plurality of backup records of a plurality of historical backup operations performed on the backup system are obtained, respectively. Data distribution associated with the at least one backup attribute is determined based on the plurality of backup records.

16 Claims, 8 Drawing Sheets

METHOD, DEVICE, AND COMPUTER PROGRAM PRODUCT FOR MANAGING BACKUP SYSTEM

CROSS-REFERENCE TO RELATED APPLICATIONS

This application claims priority to Chinese Patent Application No. 202010052854.X filed on Jan. 17, 2020. Chinese Patent Application No. 202010052854.X is hereby incorporated by reference in its entirety.

FIELD

Various implementations of the present disclosure relate to backup systems, and more specifically, to a method, device and computer program product for managing a backup of user data to a backup system.

BACKGROUND

With the development of backup systems, various types of user systems have emerged. A user of a user system may back up his/her own user data at different time points so as to form backup copies. Subsequently, the user may submit a backup request to a backup system so as to transmit backup copies to the backup system. In another example, the user may submit a recovery request to the backup system so as to fetch a backup copy from the backup system and further recover the user system to the fetched backup copy.

Different users have different demands. For example, one user may want to perform a backup operation between 21:00 and 05:00 every day and may want to keep the backup copy in the backup system for 1 year. Another user may want to perform a backup operation between 00:00 and 06:00 every day and may want to keep the backup copy in the backup system for 1 month. As time elapses, the amount of data in the backup system may continually increase, and data in the backup system needs to be migrated to a new backup system with larger capacity. At this point, how to manage backup demands of a large number of users has may become difficult.

SUMMARY

According to a first aspect of the present disclosure, a method is provided for managing a backup system. In the method, at least one backup attribute of a backup demand on the backup system is determined, the at least one backup attribute describing at least one aspect of a demand on the backup system from a user of the backup system. A plurality of backup records of a plurality of historical backup operations performed on the backup system are obtained, respectively. Data distribution associated with the at least one backup attribute is determined based on the plurality of backup records.

According to a second aspect of the present disclosure, an electronic device is provided, the electronic device comprising: at least one processor; and a memory coupled to the at least one processor, the memory having instructions stored thereon, the instructions, when executed by the at least one processor, causing the device to perform acts for managing a backup system. The acts include: determining at least one backup attribute of a backup demand on the backup system, the at least one backup attribute describing at least one aspect of a demand on the backup system from a user of the backup system; obtaining a plurality of backup records of a plurality of historical backup operations performed on the backup system; and determining data distribution associated with the at least one backup attribute based on the plurality of backup records.

According to a third aspect of the present disclosure, a computer program product is provided. The computer program product is tangibly stored on a non-transitory computer-readable medium and comprises machine-executable instructions which are used to implement a method according to the first aspect of the present disclosure.

BRIEF DESCRIPTION OF THE DRAWINGS

Through a more detailed description in the accompanying drawings, features, advantages and other aspects of the implementations, the present disclosure will become more apparent. Several implementations of the present disclosure are illustrated schematically and are not intended to limit the present invention. In the drawings.

DETAILED DESCRIPTION OF IMPLEMENTATIONS

The preferred implementations of the present disclosure will be described in more detail with reference to the drawings. Although the drawings illustrate the preferred implementations of the present disclosure, it should be appreciated that the present disclosure can be implemented in various ways and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text can also comprise other explicit and implicit definitions.

Figure 1:
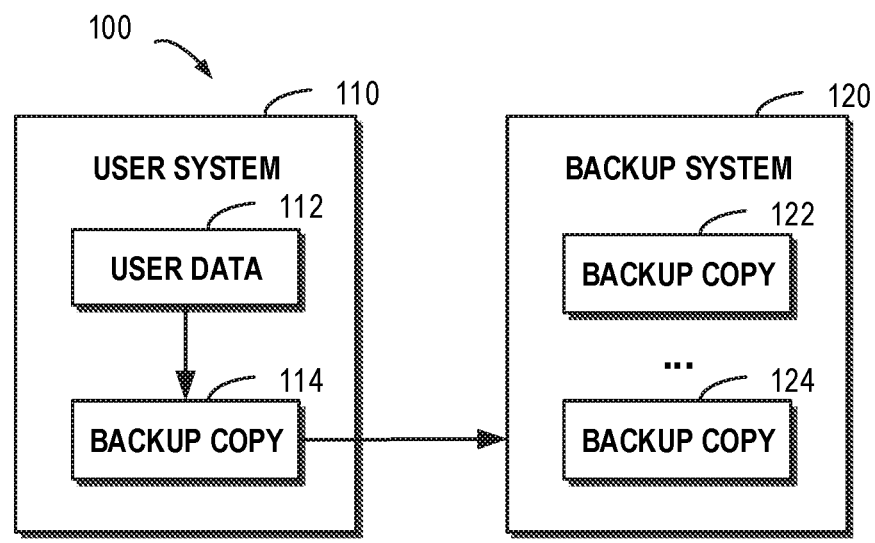
FIG. 1 schematically shows a block diagram of an application environment in which example implementations of the present disclosure may be implemented.

A description is presented to an application environment of example implementations of the present disclosure with reference to FIG. 1. This figure schematically shows a block diagram of an application environment 100 in which example implementations of the present disclosure may be implemented. As depicted, a user system 110 may comprise user data 112. It will be understood that here the user data may comprise various types, such as text data, image data, audio data, video data, database data, and an image of the user system, etc.

A user of the user system 110 may back up his/her own user data 112 to form a backup copy 114. Subsequently, the backup copy 114 may be transmitted to a backup system 120 for storage. For the sake of description, a banking system is used as an example of the user system in example implementations of the present disclosure. Here, a bank may act as a user of the backup system 120, and the user data 112 may include account data of the bank. The user data 112 may be periodically backed up to form a backup copy 114, and for example, the backup copy may be transmitted daily to the backup system 120 between 20:00 and 05:00 the next day. Backup copies formed at different time points may be sent to the backup system 120. At this point, the backup system 120 may include one or more backup copies, such as a backup copy 122, . . . , and a backup copy 124.

In a traditional backup system, backup operations are launched by users, and information on each backup operation may be stored in logs of the backup system. With the development of backup technology, a concept of backup demand has been proposed. For example, a user may sign a service level agreement (SLA) with a vendor of the backup system 120. The service level agreement may record backup demands of the user of the backup system 120 on backup operations. For example, the service level agreement may record start time, end time and a backup speed of a backup operation. The backup system 120 should provide services according to requirements of the service level agreement so as to meet the user demands.

Many existing backup systems do not involve service level agreements. When migrated from an existing backup system to a new backup system that provides a service level agreement, extra resources are needed in order to manage the service level agreement. Technical solutions have been proposed to create a service level agreement based on manual operations. Since user data backups involve complex operations, and backup demands in the existing backup system may constantly change as time elapses. Therefore, the manually created service level agreement needs to be constantly adjusted so as to conform to past historical operations.

Since it is too complex and time-consuming to create a service level agreement, in some existing backup systems, no service level agreement is created for historical backup copies of users, but a service level agreement is provided only for a new backup copy in a new backup system. As a result, some users cannot enjoy new functions of the new backup system. It will be understood that a backup system usually has tens of thousands of users and even more. At this point, it has become a difficult technical problem on how to manage user data backups.

In order to overcome drawbacks in the above technical solutions, example implementations of the present disclosure propose a technical solution for managing the backup system 120 based on statistics on historical backup operations. First, a brief description is presented to example implementations of the present disclosure with reference to FIG. 2. This figure schematically shows a block diagram 200 of a procedure for managing the backup system 120 according to example implementations of the present disclosure.

Figure 2:
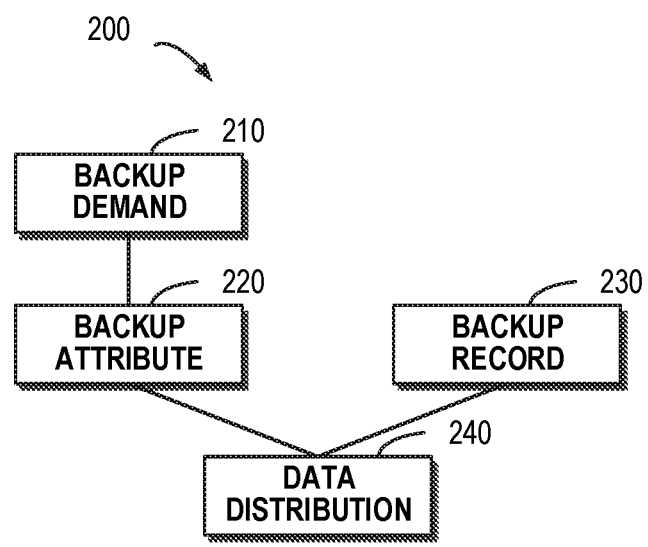
FIG. 2 schematically shows a block diagram of a procedure for managing a backup system according to example implementations of the present disclosure.

As shown in FIG. 2, at least one backup attribute 220 of a backup demand 210 on the backup system 120 may be determined. Here, the at least one backup attribute 220 describes at least one aspect of a demand on the backup system 120 from a user of the backup system 120. It will be understood that the user may have various demands. For example, the user may specify start time and end time of a backup operation, etc. In another example, the user may further specify a speed of the backup operation (e.g., in Mbps), etc. Here, the backup attribute 220 may include at least one of: start time, end time, running time, a backup speed, memory status, processor status, etc.

A plurality of backup records 230 of a plurality of historical backup operations performed on the backup system 120 may be obtained, respectively. Here, the backup record 230 may be a record in backup logs in the backup system 120. The backup logs may include various contents related to the backup operations, so data distribution 240 associated with the at least one backup attribute 220 may be determined based on the backup record 230.

It should be understood that the data distribution 240 may represent statistical information related to a plurality of historical backup operations. In this way, statistical information related to each backup attribute 220 may be readily determined. For example, a range of start time of the plurality of historical backup operations may be determined based on start time of backups recorded in the plurality of backup records 230. Further, based on the determined start time, corresponding backup start time may be set for the user in a new backup system, whether a current backup operation is consistent with the range of historical start time may be determined, and a computing resource for performing a backup operation may be selected at predetermined start time, etc.

Figure 3:
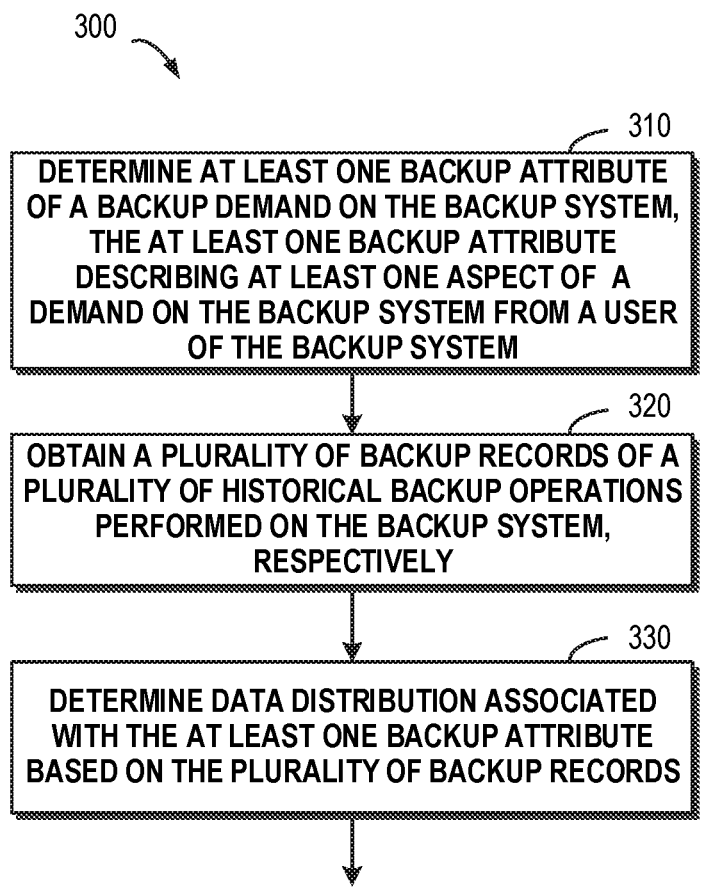
FIG. 3 schematically shows a flowchart of a method for managing a backup system according to example implementations of the present disclosure.

More details about example implementations of the present disclosure will be described with reference to FIG. 3. This figure schematically shows a flowchart of a method 300 for managing the backup system 120 according to example implementations of the present disclosure. At block 310, at least one backup attribute of a backup demand 210 on the backup system 120 may be determined. It will be understood that here the at least one backup attribute describes at least one aspect of the demand on the backup system 120 from a user of the backup system 120. It should be understood that a backup operation may involve transmitting a backup request of a backup copy from the user system 110 to the backup system 120 and retrieving a recovery request of the backup copy from the backup system 120 to the user system 110. Therefore, the backup attribute here may describe user demands of operations in these two aspects. In order to simplify the description, only a backup request for backing up data from the user system 110 to the backup system 120 will be taken as an example. Specific implementations associated with the recovery request may be determined in a similar way.

Figure 4:
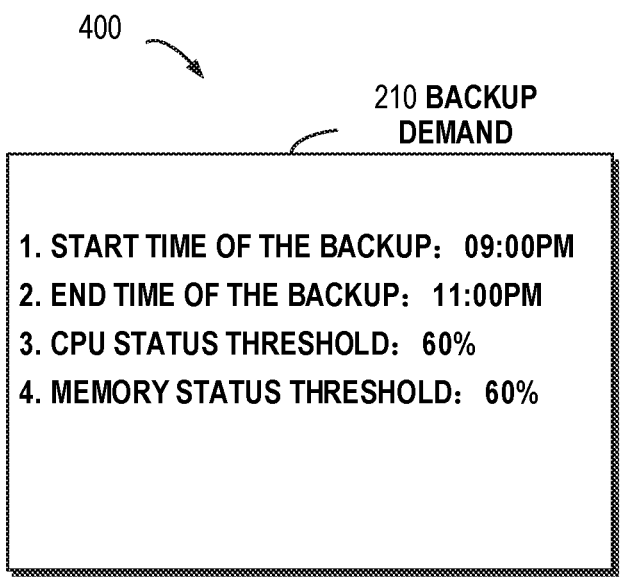
FIG. 4 schematically shows a block diagram of a backup demand according to example implementations of the present disclosure.

FIG. 4 schematically shows a block diagram 400 of the backup demand 210 according to example implementations of the present disclosure. A service level agreement is one example of the backup demand 210. Attributes of the backup demand 210 may include various contents, for example, may include at least one of: start time, end time, running time, backup speed, memory status, and processor status. As shown in FIG. 4, the first line shows that the bank requires the start time of the backup is 21:00, the second line shows that the end time of the backup is 23:00, the third line shows that a status threshold of CPU is 60% (i.e., the CPU usage occupied by the backup operation is required not to exceed 60%), and the fourth line shows that a status threshold of the memory is 60% (i.e., the memory usage occupied by the backup operation is required not to exceed 60%).

Figure 5:
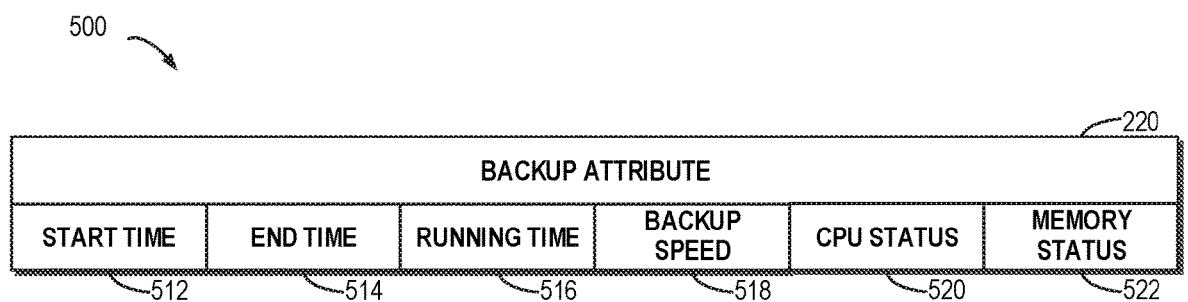
FIG. 5 schematically shows a block diagram of backup attributes in a backup demand according to example implementations of the present disclosure.

It will be understood that FIG. 4 merely shows one example of the backup demand 210. In other examples, according to definitions of the backup system 120, the backup demand 210 may include more or less attributes. Description is presented below to more examples of the attribute in the backup demand 210 with reference to FIG. 5. This figure schematically shows a block diagram 500 of a backup attribute 220 in the backup demand 210 according to example implementations of the present disclosure. As shown in FIG. 5, start time 512 represents time when a backup operation is launched, end time 514 represents time when the backup operation is ended, running time 516 represents a time duration of the backup operation, a backup speed 518 represents an amount of data (e.g., represented by Mbps or Gbps) which is backed up in a unit period, CPU status 520 represents a usage threshold of CPU during the backup operation, and memory status 522 represents a usage threshold of the memory during the backup operation.

At block 320, a plurality of backup records of a plurality of historical backup operations performed on the backup system 120 may be obtained, respectively. It will be understood that the backup record here may be a record in backup logs in the backup system 120. Table 1 schematically shows an example of backup records.

TABLE 1

Example of Backup Record

| Serial No. | Backup Record |
| --- | --- |
| 1 | 2019 Mar. 21 18:00:04 START avtar log Central Daylight Time [7.4.101-58 Windows Server 2012 R2 Standard Server Edition (No Service Pack) 64-bit-AMD64] |
| 2 | 2019 Mar. 22 01:40:41 avtar Info <6083>: Backed-up 1,894 GB in 460.63 minutes: 247 GB/hour (743,842 files/hour) |
| 3 | 2019 Mar. 22 01:41:07 avtar Stats <6145>: Memory usage (MB): (2596.000 [2562.000 . . . 2643.000] sd = 20.373 n = 15), CPU %: (78.854 [46.195 . . . 97.159] sd = 15.092 n = 14), Avg CPU = 37.1% |
| 4 | 2019 Mar. 22 01:41:07 END avtar log Central Daylight Time (5 warnings, 0 errors, 0 fatal errors) |

The four backup records shown in Table 1 show a plurality of backup attributes associated with one backup operation. For example, the first backup record represents that the start time of the backup operation is "18:00:04." The second backup record represents that the total backup data amount of the backup operation is "1,894 GB," the running time is "460.63 minutes" and the backup speed is "247 GB/hour." The third backup record shows information about memory status and CPU status. The fourth backup record shows the end time of the backup operation is "01:41:07" and warnings, errors and fatal errors during the backup operation. It will be understood that Table 1 merely shows examples of backup records, and according to example implementations of the present disclosure, the backup record may be stored in different formats.

Figure 6:
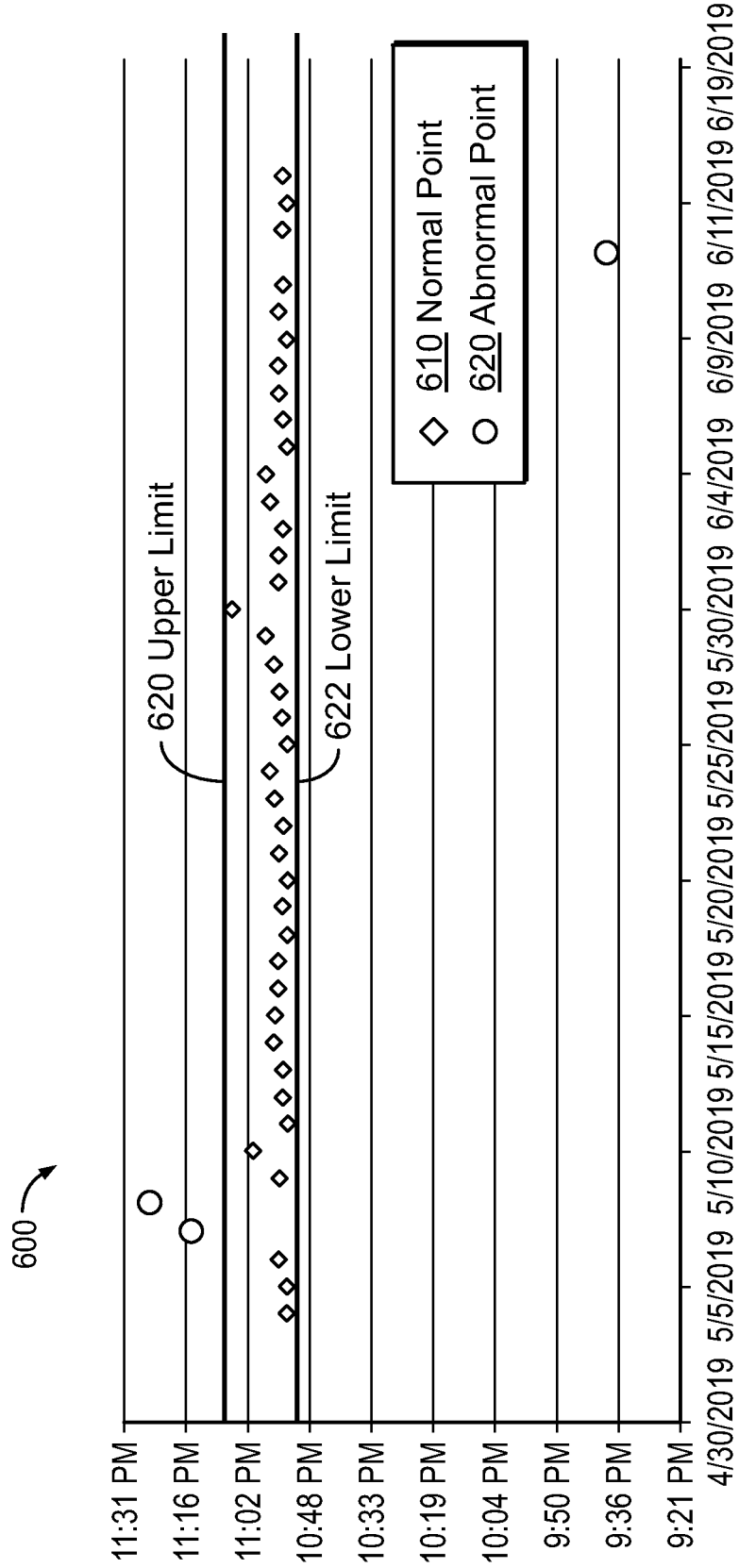
FIG. 6 schematically shows a block diagram of data distribution obtained based on historical backup records according to example implementations of the present disclosure.

Returning to FIG. 3, at block 330, data distribution 240 associated with the at least one backup attribute 220 may be determined based on the plurality of backup records. More details on how to determine the data distribution may be provided with reference to FIG. 6. This figure schematically shows a block diagram 600 of data distribution obtained based on historical backup records according to example implementations of the present disclosure. It should be understood that in FIG. 6 a backup attribute "end time" is taken as an example to illustrate how to determine the data distribution. Various points in FIG. 6 show the distribution of the end time, the horizontal axis represents a date when a backup operation is performed, and the vertical axis represents a time point when the backup operation is performed.

It will be understood that the end time of most backup operations is distributed in an area between 10:48 PM and 11:02 PM. According to example implementations of the present disclosure, the range of the data distribution may be determined more precisely. Specifically, a threshold range associated with the at least one backup attribute may be identified based on the data distribution. Here, the threshold range may represent an area that most end times fall within. Specifically, a threshold criterion associated with the threshold range may be obtained.

The threshold criterion may be defined in various ways. For example, a percentage of the number of statistical historical backup operations may be used as the threshold criterion. Suppose the threshold criterion defines that the threshold range should cover end times of 95% of historical backup operations, then an area in which time points are most dense and which can cover 95% of time points may be selected from the area shown in FIG. 6 based on the above percentage. For example, an upper limit 620 and a lower limit 622 may be used as boundaries of the threshold range. At this point, time points between 10:50 PM and 11:06 PM stand for normal points (shown by a legend 610), and time points outside this range stand for abnormal points (shown by a legend 612).

According to example implementations of the present disclosure, the threshold range may further be determined based on mean and variance. For the sake of description, the at least one backup attribute 220 of the backup demand 210 will be represented in a vector form. Suppose the backup demand 210 includes m backup attributes, then data associated with one backup operation may be represented as an m-dimensional vector X. Suppose there are n backup operations, then data associated with the $i^{th}$ backup operation may be represented as $X_i=(x_{i1}, x_{i2}, \ldots, x_{im})$ (where $1 \leq i \leq n$, and both m and n are positive integers). Subsequently, a mean $\mu_j$ and a variance $\sigma_j^2$ of the data may be determined based on Formula 1 and Formula 2, respectively.

$$\mu_j = \Sigma_{i=1}^n x_{ij}/n \qquad \text{Formula 1}$$

$$\sigma_j^2 = \Sigma_{i=1}^n (x_{ij}-\mu_j)^2/n \qquad \text{Formula 2}$$

For example, the threshold range may be determined based on the above Formula 1 and Formula 2. The threshold range may be set as comprising a predetermined range around the mean. For example, when the mean, variance and threshold range are represented as vectors μ, σ and Th, respectively, the threshold range Th may be determined based on Formula 3.

$$Th = \mu \pm k\sigma \qquad \text{Formula 3}$$

In the above Formula 3, k may represent an integer within a predetermined range, for example, k=2 or k=3. It will be understood that the larger is k, the larger is the threshold range. The smaller is k, the smaller is the threshold range (this indicates that the criterion for determining abnormal/normal states is strict). The size of k may be adjusted so as to determine the threshold range that is suitable for an application environment. It will be understood that the end time is taken as an example to illustrate how to set the threshold range associated with the end time. According to example implementations of the present disclosure, a relevant threshold range may be set for each backup attribute in the plurality of backup attributes in a similar way. For example, the threshold range relevant to the start time may be set between 07:05PM and 07:15PM, and the threshold range relevant to the backup speed may be set between 99 GB/hour and 101 GB/hour, etc.

A mean and variance associated with each backup attribute may be determined based on the above formula. Table 2 shows an example of values of backup attributes. The first column in Table 2 represents a serial number of a backup record, the second to seventh columns represent values of a plurality of backup attributes. The last two rows in Table 2 show examples of the mean and variance determined based on Formula 1 and Formula 2, respectively.

The threshold range may be determined based on the above Formula 3, and normal and abnormal backup records may be determined. It may be determined that backup attributes shown in bold in Table 2 are abnormal. For example, the end time, duration time and backup speed of the 9$^{th}$ backup record are abnormal. In another example, the backup speed, memory status and CPU status of the 12$^{th}$ backup record are abnormal. According to example implementations of the present disclosure, the backup demand of the user may be determined based on a range within which normal backup records fall.

TABLE 2

Example of Value of Backup Attribute

| No. | Start Time | End Time | Duration Time (Min) | Backup Speed (GB/Hour) | Memory Status (MB) | CPU Status (Pct) |
|---|---|---|---|---|---|---|
| 1 | 18:00:02 | 1:57:09 | 476.9 | 246 | 2561) | 33 |
| 2 | 18:00:00 | 1:55:00 | 474.7 | 245 | 2422 | 47 |
| 3 | 17:59:58 | 2:17:19 | 497.0 | 230 | 2617 | 42 |
| 4 | 17:59:58 | 2:30:02 | 509.6 | 223 | 2542 | 39 |
| 5 | 17:59:55 | 2:10:42 | 490.4 | 231 | 2559 | 29 |
| 6 | 17:59:54 | 1:57:58 | 477.8 | 238 | 2369 | 31 |
| 7 | 17:59:53 | 2:15:47 | 495.4 | 229 | 2624 | 33 |
| 8 | 18:00:04 | 1:41:07 | 460.6 | 247 | 2596 | 37 |
| 9 | 17:59:57 | *10:09:37* | *969.5* | *50* | 1881 | 16 |
| 10 | 17:59:55 | 6:18:30 | 738.4 | 214 | 2447 | 31 |
| 11 | 17:59:55 | 2:36:03 | 515.8 | 306 | 2861 | 27 |
| 12 | 17:59:54 | 7:42:20 | 822.2 | *58* | *712* | *12* |
| μ | 17:59:57 | 3:57:50 | 577.35 | 209 | 2349 | 31 |
| σ | 3 (Sec) | 10207 (Sec) | 161.5 | 73.0 | 540.9 | 14.7 |

According to example implementations of the present disclosure, the probability that a backup record is normal may be determined based on an exponential function and Gaussian distribution. For example, the probability p(X) may be determined based on Formula 4 below.

$$p(X) = \Pi_{j=1}^{m} p(x_j, u_j \sigma_j^2) = \Pi_{j=1}^{m} \exp\left(-\frac{(x_j - u_j)^2}{2\sigma_j^2}\right) \quad \text{Formula 4}$$

In Formula 4, X shows a backup record represented as an m-dimensional vector, each vector represents one backup attribute, $x_j$ represents a value of the j$^{th}$ backup attribute, $u_j$ represents a mean of the j$^{th}$ backup attribute, represents a variance of the j$^{th}$ backup attribute, and exp( )represents an exponential function. The probability that the backup record X is normal may be determined based on Formula 4. An example of relevant information of backup attributes shown in Table 3 may be determined based on Formula 4. Contents of Table 3 are similar to those of Table 2, and the difference is that the last column represents the probability determined based on Formula 4, a percent in parentheses after a value of a backup attribute represents the probability that the value is normal.

TABLE 3

Example of Value of Backup Attribute and Normal Probability

| No. | Start Time | End Time | Duration Time (Min) | Backup Speed (GB/Hour) | Memory Status (MB) | CPU Status (Pct) | p(X) |
|---|---|---|---|---|---|---|---|
| 1 | 18:00:02 | 1:57:09 | 476.9 (82.40%) | 246 (87.95%) | 2561 (92.61%) | 33 (99.07%) | 66.50% |
| 2 | 18:00:00 | 1:55:00 | 474.7 (81.71%) | 245 (88.56%) | 2422 (99.09%) | 47 (55.17%) | 39.56% |
| 3 | 17:59:58 | 2:17:19 | 497.0 (88.35%) | 230 (95.95%) | 2617 (88.45%) | 42 (75.49%) | 56.60% |
| 4 | 17:59:58 | 2:30:02 | 509.6 (91.58%) | 223 (98.18%) | 2542 (93.83%) | 39 (86.18%) | 72.71% |

TABLE 3-continued

Example of Value of Backup Attribute and Normal Probability

| No. | Start Time | End Time | Duration Time (Min) | Backup Speed (GB/Hour) | Memory Status (MB) | CPU Status (Pct) | p(X) |
|---|---|---|---|---|---|---|---|
| 5 | 17:59:55 | 2:10:42 | 490.4 (86.51%) | 231 (95.56%) | 2559 (92.74%) | 29 (99.07%) | 75.97% |
| 6 | 17:59:54 | 1:57:58 | 477.8 (82.68%) | 238 (92.42%) | 2369 (99.93%) | 31 (100.00%) | 76.36% |
| 7 | 17:59:53 | 2:15:47 | 495.4 (87.93%) | 229 (96.32%) | 2624 (87.88%) | 33 (99.07%) | 73.74% |
| 8 | 18:00:04 | 1:41:07 | 460.6 (77.01%) | 247 (87.34%) | 2596 (90.10%) | 37 (91.98%) | 55.74% |
| 9 | 17:59:57 | *10:09:37* | *969.5(5.24%)* | *50 (9.34%)* | 1881 (68.78%) | 16 (59.29%) | *0.20%* |
| 10 | 17:59:55 | 6:18:30 | 738.4 (60.82%) | 214 (99.77%) | 2447 (98.37%) | 31 (100.00%) | 59.69% |
| 11 | 17:59:55 | 2:36:03 | 515.8 (92.99%) | 306 (41.38%) | 2861 (63.89%) | 27 (96.35%) | 23.69% |
| 12 | 17:59:54 | 7:42:20 | 822.2 (31.67%) | *58 (11.79%)* | *712 (1.03%)* | *12 (43.23%)* | *0.02%* |
| μ | 17:59:57 | 3:57:50 | 577.35 | 209 | 2349 | 31 | |
| σ | 3 (Sec) | 10207 (Sec) | 161.5 | 73.0 | 540.9 | 14.7 | |

It may be determined based on probabilities in Table 3 that the end time, duration time and backup speed of the 9$^{th}$ backup record are abnormal (as denoted by being bolded in Table 3), and the backup speed, memory status and CPU status of the 12$^{th}$ backup record are abnormal.

According to example implementations of the present disclosure, a given candidate value associated with a given backup attribute in the at least one backup attribute may be obtained based on the threshold range. For example, a value within the threshold range may be selected as the given candidate value of the given backup attribute. According to example implementations of the present disclosure, the mean may be used as a candidate value. In the example of Table 3, the start time may be set as "17:59:57." According to example implementations of the present disclosure, the candidate value may be determined based on the mean and variance. For example, a value (e.g., a value within a range of μ±σ) around the mean may be selected as the candidate value.

According to example implementations of the present disclosure, the user's backup demand on the backup system 120 may be generated based on the given candidate value. It will be understood that in a new backup system, the backup demand may be generated using candidate values related to various backup attributes. For example, in the example of Table 3, the backup demand may be generated based on means. At this point, the generated backup demand may be as shown in Table 4 below.

TABLE 4

Example of Backup Demand

| No. | Backup Attribute | Value |
|---|---|---|
| 1 | Start Time | 17:59:57 |
| 2 | End Time | 3:57:50 |
| 3 | Duration Time (Min) | 577.35 |
| 4 | Backup Speed (GB/Hour) | 209 |
| 5 | Memory Status (MB) | 2349 |
| 6 | CPU Status (Pct) | 31 |

With example implementations of the present disclosure, a backup demand does not need to be manually generated for each user, but a backup demand suitable for the user may be automatically generated based on statistics on historical backup operations. It will be understood that although the backup demand generated as such may not fully satisfy user expectations, the generated backup demand may be adjusted with finer granularity so as to obtain a backup demand which the user expects. In this way, the performance of generating backup demands may be greatly improved, and a lot of labor and time overheads of setting a specific value for each backup attribute may be avoided.

With example implementations of the present disclosure, it may be further verified whether the backup demand provided by the user is consistent with the past historical statistics. The backup demand of the user of the backup system may be obtained. Subsequently, a portion associated with the given backup attribute in the backup demand may be managed based on the given candidate value. For example, if it is determined that the backup demand matches the candidate value, it may be verified that the backup demand is legal; otherwise, a notification may be provided so as to prompt the user to update the backup request.

In accordance with determining that the portion does not match the candidate value, a notification is provided to update the portion. Suppose the start time included in the backup demand set by the user is 18:00:00, a range of the start time obtained based on historical statistics is 17:59:57±9 seconds, at which point it may be determined that the start time set by the user is legal. If the start time included in the backup demand set by the user is 17:00:00, then the start time severely deviates from the candidate value. At this point, the user may be reminded that the start time "17:00:00" may be erroneous, and may inquire whether the start time in the backup demand is to be updated based on the mean "17:59:57."

According to example implementations of the present disclosure, a processing resource for performing a backup operation may be selected from processing resources in the backup system 120 based on the given candidate value. It will be understood that the backup operation will occupy a processing resource in the backup system 120, so the required processing resource may be selected from the backup system 120 to serve the backup operation during a corresponding period defined in the backup demand.

According to example implementations of the present disclosure, based on the obtained statistical information, it may be further determined whether the backup operation being currently performed in the backup system 120 is consistent with historical data distribution. Specifically, a current backup record of a current backup request for transmitting a backup copy to the backup system °may be obtained. Here, the format of the current backup record may be consistent with that of a historical backup record, e.g., may include the plurality of backup attributes shown in FIG. 5.

Based on the current backup record and the threshold range, it may be determined whether the current backup operation is abnormal. With example implementations of the present disclosure, a historical threshold range may be used as a criterion for verifying whether the current backup operation is normal. In this way, it may be determined through simple comparison whether the current backup operation is normal.

Specifically, current data associated with the at least one backup attribute may be determined based on the current backup record. It will be understood that the current data may be represented in various ways. For example, the current data may be represented in a vector form, and a plurality of dimensions in the vector may correspond to the plurality of backup attributes shown in FIG. 5, respectively. In another example, the current data may be represented as a value, as long as the current data is represented in the same way as the threshold range.

According to example implementations of the present disclosure, if it is determined that the current data matches the threshold range, it may be determined that the current backup operation is normal. If it is determined that the current data does not match the threshold range, then it may be determined that the current backup operation is abnormal. It will be understood that circumstances may exist in which values of some backup attributes in a backup record are normal while values of some backup attributes are abnormal. According to example implementations of the present disclosure, if values of all backup attributes are normal, it means that the backup operation is normal. If values of a part of backup attributes are abnormal, it means that the backup operation is abnormal.

Figure 7:
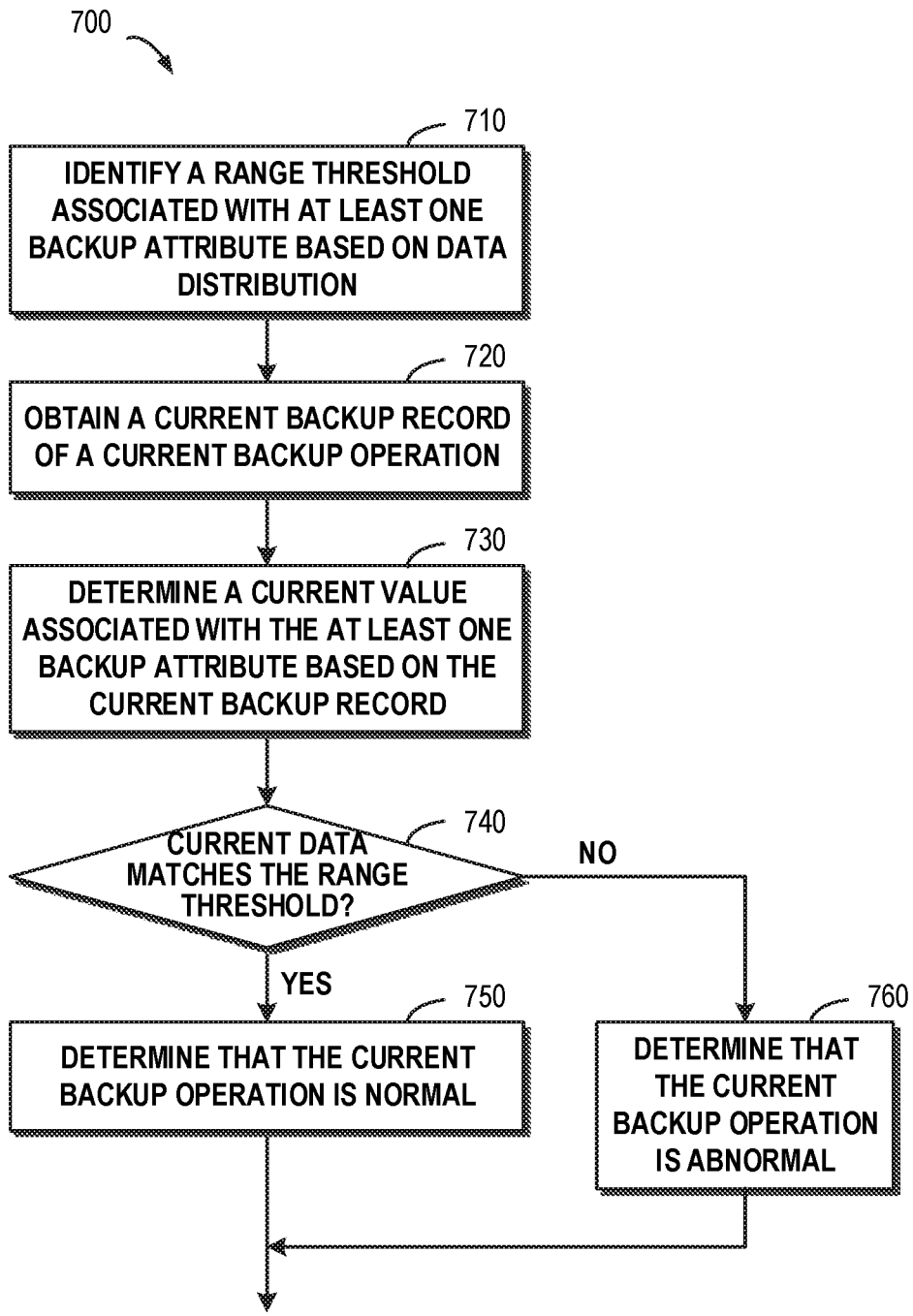
FIG. 7 schematically shows a flowchart of a method for determining whether a current backup operation is abnormal according to example implementations of the present disclosure.

FIG. 7 schematically shows a flowchart of a method 700 for determining whether a current backup operation is abnormal according to example implementations of the present disclosure. At block 710, a threshold range associated with the at least one backup attribute 220 may be identified based on data distribution. At block 720, a current backup record of a current backup operation for backing up data to the backup system 120 may be obtained. Here, the current backup record may include various contents, e.g., may include the plurality of backup attributes shown in FIG. 5. At block 730, a current value associated with the at least one backup attribute 220 may be determined based on the current backup record. At block 740, the current value may be compared with the threshold range so as to determine whether they match each other. If the judgment result is yes, the method 700 proceeds to block 750 so as to determine the current backup operation is normal. If the judgment result is no, the method 700 proceeds to block 760 so as to determine the current backup operation is abnormal.

With example implementations of the present disclosure, it may be easily and effectively determined whether there is an abnormal backup operation. Suppose historical statistical data shows that the user system 110 starts backup at 18:00 every day, whereas a backup operation is still not started up to 19:00 one day, then at this point the administrator of the user system 110 may be notified to check the status of the user system 110 for determining whether the user system 110 is abnormal.

While examples of the method according to the present disclosure have been described in detail with reference to FIGS. 2 to 7, description is presented below to the implementation of a corresponding apparatus. Specifically, an apparatus is provided for managing a backup system. The apparatus comprises: a determining module configured to determine at least one backup attribute of a backup demand on the backup system, the at least one backup attribute describing at least one aspect of a demand on the backup system from a user of the backup system; an obtaining module configured to obtain a plurality of backup records of a plurality of historical backup operations performed on the backup system, respectively; and a distribution determining module configured to determine data distribution associated with the at least one backup attribute based on the plurality of backup records.

According to example implementations of the present disclosure, the apparatus further comprises: an identifying module configured to identify a threshold range associated with the at least one backup attribute based on the data distribution; and a candidate obtaining module configured to obtain a given candidate value associated with a given backup attribute of the at least one backup attribute based on the threshold range.

According to example implementations of the present disclosure, the identifying module comprises: a threshold criterion obtaining module configured to obtain a threshold criterion associated with the threshold range; and a threshold determining module configured to determine the threshold range based on the threshold criterion.

According to example implementations of the present disclosure, the apparatus further comprises: a generating module configured to generate a backup demand for a user of the backup system based on the given candidate value.

According to example implementations of the present disclosure, the apparatus further comprises: a demand obtaining module configured to obtain a backup demand from a user of on the backup system; and a managing module configured to manage a portion associated with the given backup attribute in the backup demand based on the given candidate value.

According to example implementations of the present disclosure, the managing module further comprises: a notifying module configured to, in accordance with determining that the portion does not match the given candidate value, provide a notification of updating the portion.

According to example implementations of the present disclosure, the apparatus further comprises: a selecting module configured to select a processing resource for performing a backup operation from processing resources in the backup system based on the given candidate value.

According to example implementations of the present disclosure, the apparatus further comprises: a current record obtaining module configured to obtain a current backup record of a current backup operation for backing up user data to the backup system; and an anomaly determining module configured to determine based on the current backup record and the threshold range whether the current backup operation is abnormal.

According to example implementations of the present disclosure, the anomaly determining module further comprises: a data determining module configured to determine current data associated with the at least one backup attribute based on the current backup record; and a normal status determining module configured to, in accordance with determining that the current data matches the threshold range, determine that the current backup operation is normal; and an abnormal status determining module configured to, in accordance with determining that the current data does not match the threshold range, determine that the current backup operation is abnormal.

According to example implementations of the present disclosure, the at least one backup attribute comprises at least one of: start time, end time, running time, a backup speed, memory status, and processor status.

Figure 8:
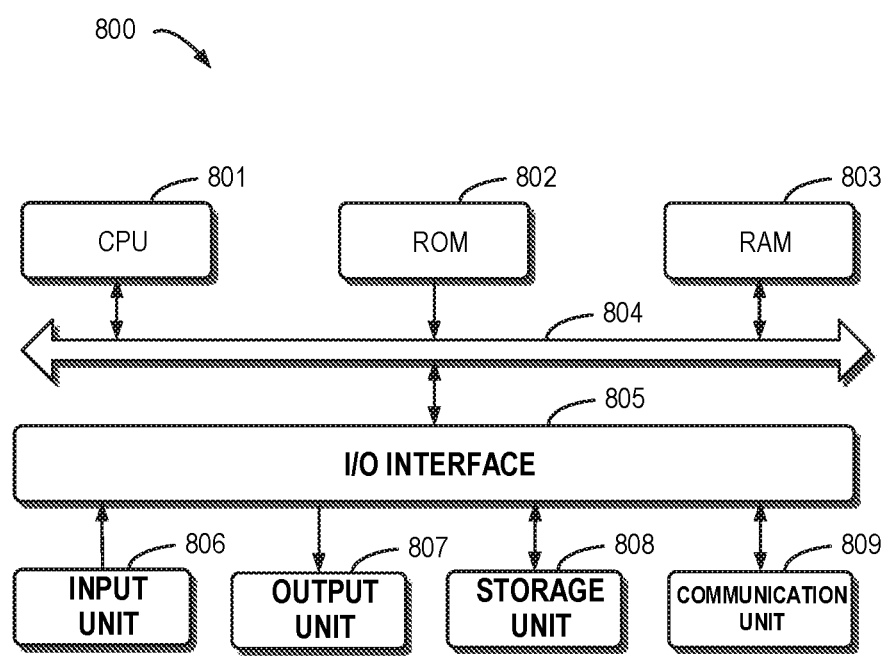
FIG. 8 schematically shows a block diagram of a device for managing a backup system according to example implementations of the present disclosure.

FIG. 8 schematically shows a block diagram of a device 800 for managing a task in an application node according to example implementations of the present disclosure. As depicted, the device 800 includes a central processing unit (CPU) 801, which can execute various suitable actions and processing based on the computer program instructions stored in the read-only memory (ROM) 802 or computer program instructions loaded in the random-access memory (RAM) 803 from a storage unit 808. The RAM 803 can also store all kinds of programs and data required by the operations of the device 800. CPU 801, ROM 802 and RAM 803 are connected to each other via a bus 804. The input/output (I/O) interface 805 is also connected to the bus 804.

A plurality of components in the device 800 are connected to the I/O interface 805, including: an input unit 806, such as a keyboard, mouse and the like; an output unit 807, e.g., various kinds of displays and loudspeakers etc.; a storage unit 808, such as a magnetic disk and optical disk, etc.; and a communication unit 809, such as a network card, modem, wireless transceiver and the like. The communication unit 809 allows the device 800 to exchange information/data with other devices via the computer network, such as Internet, and/or various telecommunication networks.

The above described process and treatment, such as the methods 300 and 700 can also be executed by the processing unit 801. For example, in some implementations, the methods 300 and 700 can be implemented as a computer software program tangibly included in the machine-readable medium, e.g., the storage unit 808. In some implementations, the computer program can be partially or fully loaded and/or mounted to the device 800 via ROM 802 and/or the communication unit 809. When the computer program is loaded to the RAM 803 and executed by the CPU 801, one or more steps of the above described methods 300 and 700 can be implemented. Alternatively, in other implementations, the CPU 801 can also be configured in other suitable ways to realize the above procedure/method.

According to example implementations of the present disclosure, an electronic device is provided, the electronic device comprising: at least one processor; and a memory coupled to the at least one processor, the memory having instructions stored thereon, the instructions, when executed by the at least one processor, causing the device to perform acts for managing a backup system. The acts include: determining at least one backup attribute of a backup demand on the backup system, the at least one backup attribute describing at least one aspect of a demand on the backup system from a user of the backup system; obtaining a plurality of backup records of a plurality of historical backup operations performed on the backup system; and determining data distribution associated with the at least one backup attribute based on the plurality of backup records.

According to example implementations of the present disclosure, the acts further comprise: identifying a threshold range associated with the at least one backup attribute based on the data distribution; and obtaining a given candidate value associated with a given backup attribute of the at least one backup attribute based on the threshold range.

According to example implementations of the present disclosure, identifying the threshold range associated with the at least one backup attribute based on the data distribution comprises: obtaining a threshold criterion associated with the threshold range; and determining the threshold range based on the threshold criterion.

According to example implementations of the present disclosure, the acts further comprise: generating a backup demand for a user of the backup system based on the given candidate value.

According to example implementations of the present disclosure, the acts further comprise: obtaining a backup demand from a user of the backup system; and managing a portion associated with the given backup attribute in the backup demand based on the given candidate value.

According to example implementations of the present disclosure, managing the portion associated with the given backup attribute in the backup demand comprises: in accordance with determining that the portion does not match the given candidate value, providing a notification of updating the portion.

According to example implementations of the present disclosure, the acts further comprise: selecting a processing resource for performing a backup operation from processing resources in the backup system based on the given candidate value.

According to example implementations of the present disclosure, the acts further comprise: obtaining a current backup record of a current backup operation for backing up user data to the backup system; and determining based on the current backup record and the threshold range whether the current backup operation is abnormal.

According to example implementations of the present disclosure, determining based on the current backup record and the threshold range whether the current backup operation is abnormal comprises: determining current data associated with the at least one backup attribute based on the current backup record; and in accordance with determining that the current data matches the threshold range, determining that the current backup operation is normal; and in accordance with determining that the current data does not match the threshold range, determining that the current backup operation is abnormal.

According to example implementations of the present disclosure, the at least one backup attribute comprises at least one of: start time, end time, running time, a backup speed, memory status, and processor status.

According to example implementations of the present disclosure, there is provided a computer program product. The computer program product is tangibly stored on a non-transitory computer-readable medium and comprises machine-executable instructions which are used to implement the method according to the present disclosure.

According to example implementations of the present disclosure, there is provided a computer-readable medium. The computer-readable medium has machine-executable instructions stored thereon, the machine-executable instructions, when executed by at least one processor, causing the at least one processor to implement the method according to the present disclosure.

The present disclosure can be a method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, an electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD- ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combination of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including local area network (LAN) and wide area network (WAN), or to the external computer (e.g., connected via Internet using an Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow charts and/or block diagrams of method, apparatus (system) and computer program products according to implementations of the present disclosure. It should be understood that each block of the flow charts and/or block diagrams and the combination of various blocks in the flow charts and/or block diagrams can be implemented by computer-readable program instructions.

The computer-readable program instructions can be provided to the processing unit of a general-purpose computer, dedicated computer or other programmable data processing apparatuses to manufacture a machine, such that the instructions, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular way, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, the other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow charts and block diagrams in the drawings illustrate system architecture, functions and operations that may be implemented by system, method and computer program products according to a plurality of implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order depending on the functions involved. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable others of ordinary skill in the art to understand implementations of the present disclosure.

The invention claimed is:

1. A method for managing a backup system, the method comprising:
   determining at least one backup attribute of a backup demand on the backup system, the at least one backup attribute describing at least one aspect of the backup demand on the backup system from a user of the backup system;
   obtaining a plurality of backup records for a plurality of historical backup operations performed on the backup system;
   determining a data distribution associated with the at least one backup attribute based on the plurality of backup records;
   identifying a threshold range associated with the at least one backup attribute based on the data distribution;

obtaining a current backup record of a current backup operation for backing up user data to the backup system; and determining based on the current backup record and the threshold range whether the current backup operation is abnormal by:
   determining current data associated with the at least one backup attribute based on the current backup record;
   in accordance with determining that the current data matches the threshold range, determining that the current backup operation is normal; and
   in accordance with determining that the current data does not match the threshold range, determining that the current backup operation is abnormal.

2. The method of claim 1, further comprising:
obtaining a given candidate value associated with a given backup attribute of the at least one backup attribute based on the threshold range.

3. The method of claim 2, further comprising:
generating a second backup demand for the user of the backup system based on the given candidate value.

4. The method of claim 2, further comprising:
obtaining a second backup demand from the user of the backup system; and
managing a portion associated with the given backup attribute in the second backup demand based on the given candidate value.

5. The method of claim 4, wherein managing the portion associated with the given backup attribute in the second backup demand comprises:
in accordance with determining that the portion does not match the given candidate value, providing a notification of updating the portion.

6. The method of claim 2, further comprising:
selecting a processing resource for performing a backup operation from processing resources in the backup system based on the given candidate value.

7. The method of claim 1, wherein identifying the threshold range associated with the at least one backup attribute based on the data distribution comprises:
obtaining a threshold criterion associated with the threshold range; and
determining the threshold range based on the threshold criterion.

8. The method of claim 1, wherein the at least one backup attribute comprises at least one of: start time, end time, running time, a backup speed, memory status, and processor status.

9. An electronic device, comprising:
at least one processor; and
a memory coupled to the at least one processor, the memory having instructions stored thereon, the instructions, when executed by the at least one processor, causing the electronic device to perform a method for managing a backup system, the method comprising:
   determining at least one backup attribute of a backup demand on the backup system, the at least one backup attribute describing at least one aspect of the backup demand on the backup system from a user of the backup system;
   obtaining a plurality of backup records for a plurality of historical backup operations performed on the backup system, respectively;
   determining a data distribution associated with the at least one backup attribute based on the plurality of backup records;
   identifying a threshold range associated with the at least one backup attribute based on the data distribution;
   obtaining a current backup record of a current backup operation for backing up user data to the backup system; and
   determining based on the current backup record and the threshold range whether the current backup operation is abnormal by:
      determining current data associated with the at least one backup attribute based on the current backup record;
      in accordance with determining that the current data matches the threshold range, determining that the current backup operation is normal; and
      in accordance with determining that the current data does not match the threshold range, determining that the current backup operation is abnormal.

10. The electronic device of claim 9, wherein the method further comprises:
obtaining a given candidate value associated with a given backup attribute of the at least one backup attribute based on the threshold range.

11. The electronic device of claim 10, wherein the method further comprises:
generating a second backup demand for the user of the backup system based on the given candidate value.

12. The electronic device of claim 10, wherein the method further comprises:
obtaining a second backup demand from the user of the backup system; and
managing a portion associated with the given backup attribute in the second backup demand based on the given candidate value.

13. The electronic device of claim 12, wherein managing the portion associated with the given backup attribute in the second backup demand comprises:
in accordance with determining that the portion does not match the given candidate value, providing a notification of updating the portion.

14. The electronic device of claim 10, wherein the method further comprises:
selecting a processing resource for performing a backup operation from processing resources in the backup system based on the given candidate value.

15. The electronic device of claim 9, wherein identifying the threshold range associated with the at least one backup attribute based on the data distribution comprises:
obtaining a threshold criterion associated with the threshold range; and
determining the threshold range based on the threshold criterion.

16. A computer program product, tangibly stored on a non-transitory computer-readable medium and comprising machine-executable instructions, which are used to perform a method, the method comprising:
determining at least one backup attribute of a backup demand on a backup system, the at least one backup attribute describing at least one aspect of the backup demand on the backup system from a user of the backup system;
obtaining a plurality of backup records for a plurality of historical backup operations performed on the backup system;
determining a data distribution associated with the at least one backup attribute based on the plurality of backup records;

identifying a threshold range associated with the at least one backup attribute based on the data distribution;

obtaining a current backup record of a current backup operation for backing up user data to the backup system; and determining based on the current backup record and the threshold range whether the current backup operation is abnormal by:

determining current data associated with the at least one backup attribute based on the current backup record;

in accordance with determining that the current data matches the threshold range, determining that the current backup operation is normal; and in accordance with determining that the current data does not match the threshold range, determining that the current backup operation is abnormal.

* * * * *